(No Model.)
G. W. KING.
Spring Draft Tug.
No. 230,554. Patented July 27, 1880.
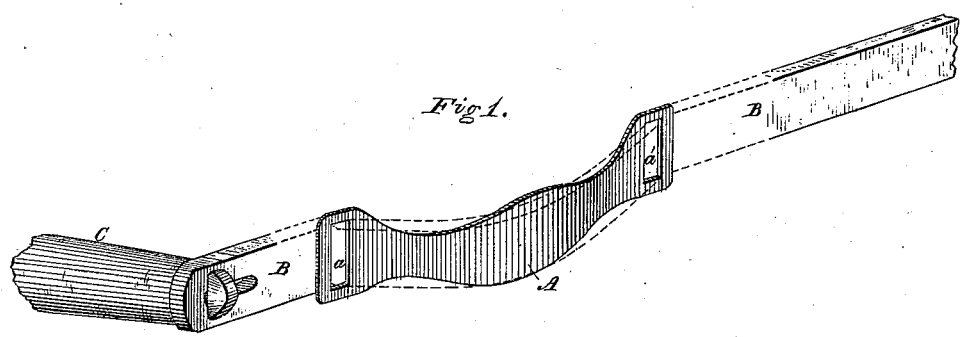
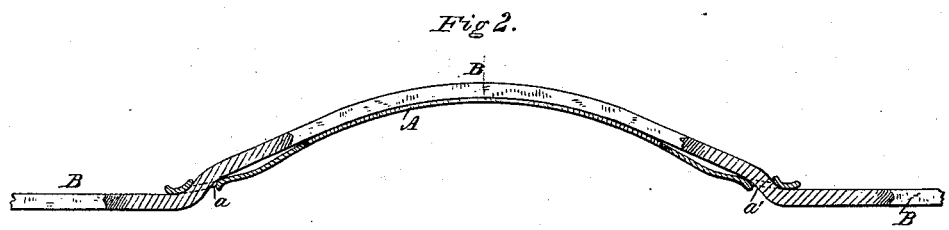
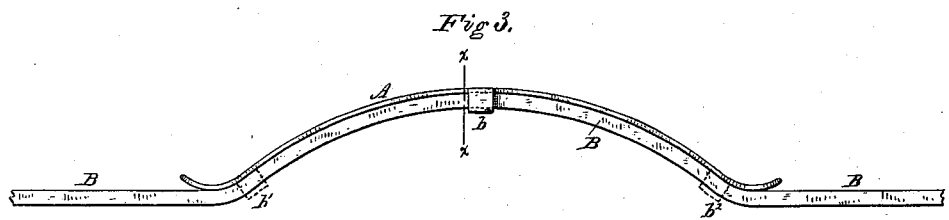
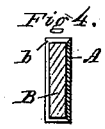
Witnesses.   Inventor.

UNITED STATES PATENT OFFICE.

GEORGE W. KING, OF GEORGETOWN, ASSIGNOR TO HIMSELF AND ZEBULON M. P. KING, OF WASHINGTON, DISTRICT OF COLUMBIA.

SPRING DRAFT-TUG.

SPECIFICATION forming part of Letters Patent No. 230,554, dated July 27, 1880.

Application filed May 19, 1880. (No model.)

*To all whom it may concern:*

Be it known that I, GEORGE W. KING, of Georgetown, in the District of Columbia, have invented certain new and useful Improvements in Spring Draft-Tugs; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention belongs to a class of devices in which a spring is employed in the draft-connection between the draft-power and the load, for the purpose of lessening by its elastic resistance the injurious effect of excessive and variable strain incident to irregularities in the action; and it specially relates to devices in which a spring is employed for this purpose in the draft tug or trace of a draft-animal's harness.

The object is to provide a spring of this character of simple and inexpensive construction, light, strong, durable, effective, and safe, adapted to be used, either singly or in groups, with any ordinary flexible trace, and to be attached and removed with ease and at will without affecting the capacity of the trace to perform its function in the ordinary way when the spring is detached, and also so shaped and constructed for attachment to the trace that the strain upon the spring will be limited and regulated.

The invention consists in the employment as a draft-spring of a simple bent plate-spring or semi-elliptical spring, either single or laminated, and in attaching the spring to a flexible trace by lacing the trace through eyes or staples, with which the spring is provided for the purpose. It is illustrated in the accompanying drawings, in which—

Figure 1 is a perspective of the spring attached to a trace. Fig. 2 is a top plan of the same with the ends of the spring in longitudinal section. Fig. 3 is a top-plan view of a modified form of the device. Fig. 4 is a transverse section cut through the line $xx$ of Fig. 3. Fig. 5 is a modified form of end of spring as shown in Fig. 1 or Fig. 3. Fig. 6 is a transverse section of same.

Similar letters refer to similar parts throughout the several views.

A is a bent plate-spring provided with slots $a\ a'$ at its ends. B is the trace to which the spring A is attached. C is a whiffletree.

The attachment of the spring to the trace is accomplished by passing one end of the trace up through one slot, along the upper or convex surface of the spring, and down through the other slot. In Figs. 1 and 2 the trace B is shown passed through the slots $a\ a'$, and embracing with its loop the convexity of the spring between the slots.

Instead of slots, staples, as shown at $b\ b'b^2$, Figs. 3 and 4, may be used on the under surface of the spring, at the center and elsewhere, through which to reeve the trace along the concavity of the spring.

In Figs. 5 and 6 the edges of the spring are shown turned up at $d$ to form a substitute for the slot or staple. The slots and other slides, being intended for the draft-tugs, are shaped to suit the purpose. I sometimes attach the spring to the trace by inserting it within the trace, made double for the purpose, in which situation a tension tending to bring the two parts of the trace together will tend to compress the spring between them. Each spring preferably consists of a single piece of metal. When this is the case it may be stamped out of a single sheet at one blow. The springs may be made different in size and power, and envelopes, ornamentation, and padding may be applied to them, as desired.

The operation of this improvement is that of a draft-spring to favorably modify by its elasticity irregularities of action, receiving with safety sudden shocks and blows, which might otherwise injure the animal, load, or harness. The tendency of the strain on the spring is to compress or flatten it. The strain is exerted upon it in generally opposite directions at its middle portion and at its ends and in lines transverse to the line of traction. Directly the spring is subjected to but little longitudinal strain. The construction allows the trace to slip in the slots, and the consequence is that, leaving out of consideration the slight strain resulting from frictional contact with the trace, the spring is subjected to no more strain than is sufficient to counterbalance its resistance to compression. The remaining strain is confined to the trace and other connections. An important result is that the danger of breaking the spring is greatly reduced.

Other advantages attend the use of this draft-spring. Among them the following may be noted: The number of springs upon the traces may be readily increased or diminished, thus correspondingly varying the degree of elastic resistance as occasion requires. In case of breakage of the spring the accident would not involve the separation of the draft-connection. The spring can be applied to any part of the trace between the hame and whiffletree without requiring any change or preparation of the trace.

The device may be used for spring-couplings, and it is appropriate for any flexible connections which are subjected to tension and liable to irregular action.

What I claim as my invention, and desire to secure by Letters Patent, is—

1. The combination of a flexible draft-tug and a semi-elliptical spring, substantially in the manner described, whereby the tensile strain is borne by the tug and the compressing strain by the spring, as explained.

2. In combination with a semi-elliptical spring, a flexible trace passing through eyes at the ends of the spring and over its convexity between the eyes, all substantially as described.

3. In combination with a semi-elliptical spring, a flexible trace passing along the concave surface of the spring through staples or slides, all substantially as described.

4. A spring draft-tug consisting of a semi-elliptical spring attached to a flexible trace, and adapted to slide on the same by means of eyes or staples, all substantially as described.

In testimony that I claim the foregoing as my own I hereto affix my signature in presence of two witnesses.

GEO. W. KING.

Witnesses:
C. STORRS,
CHARLES WALTER.